(12) United States Patent
Sugimoto et al.

(10) Patent No.: US 9,204,416 B2
(45) Date of Patent: Dec. 1, 2015

(54) GATEWAY APPARATUS, CONTROL METHOD THEREFOR AND COMPUTER PROGRAM

(75) Inventors: Shinta Sugimoto, Kanagawa (JP); Ryoji Kato, Kanagawa (JP)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 301 days.

(21) Appl. No.: 13/881,025

(22) PCT Filed: Nov. 1, 2010

(86) PCT No.: PCT/JP2010/069771
§ 371 (c)(1),
(2), (4) Date: Apr. 23, 2013

(87) PCT Pub. No.: WO2012/060019
PCT Pub. Date: May 10, 2012

(65) Prior Publication Data
US 2013/0208703 A1 Aug. 15, 2013

(51) Int. Cl.
*H04W 4/00* (2009.01)
*H04W 60/04* (2009.01)
*H04L 12/66* (2006.01)
*H04W 8/24* (2009.01)
*H04W 8/26* (2009.01)
*H04W 88/16* (2009.01)

(52) U.S. Cl.
CPC ............... *H04W 60/04* (2013.01); *H04L 12/66* (2013.01); *H04W 4/005* (2013.01); *H04W 8/245* (2013.01); *H04W 8/265* (2013.01); *H04W 88/16* (2013.01)

(58) Field of Classification Search
CPC ...................................................... H04W 60/04
USPC .......................................................... 370/331
See application file for complete search history.

(56) References Cited

PUBLICATIONS

3GPP, "Procedure to initially provision the MCIM", 3GPP TR 33.812 V9.2.0, Release 9, Jun. 2010, pp. 29-32.
3GPP, "3rd Generation Parternship Project; Technical Specification Group Services and System Aspects; Feasibility Study on the Security Aspects of Remote Provisioning and Change of Subscription for M2M Equipment; (Release 9)", 3GPP TR 33.812 V9.0.0, Dec. 2009, 91 pages.

*Primary Examiner* — Shripal Khajuria
(74) *Attorney, Agent, or Firm* — Rothwell, Figg, Ernst & Manbeck, P.C.

(57) ABSTRACT

A gateway apparatus comprises a registration unit for registering a network address, a temporary address and a flag, a receiving unit for receiving data destined to a destination communication device with the network address of the destination communication device from a source communication device, a determination unit for determining whether the destination communication device is provided with the MCIM or not, based on a registered value of the flag, and transmitting unit for transmitting a bootstrap message for requesting initiation of provisioning of a predetermined identifier to the destination communication device, to a provision server, when it is determined that the destination communication device is not provided with the MCIM, wherein the transmitting unit transmits the data to the destination communication device using the assigned temporary address, when the destination communication device is provided with the MCIM.

13 Claims, 9 Drawing Sheets

| ID / 301 | Home Address / 302 | Care of Address / 303 | MCIM flag / 304 |
|---|---|---|---|
| M2ME1 | IP-a1 | IP-a1 | 1 |
| M2ME2 | IP-a2 | IP-b1 | 1 |
| M2ME3 | IP-a3 | :: | 1 |
| M2ME4 | IP-a4 | IP-a4 | 0 |
| M2ME5 | IP-a5 | :: | 0 |
| M2ME6 | IP-a6 | IP-c1 | 0 |
| . | . | . | . |
| . | . | . | . |
| . | . | . | . |

| ID — 401 | MSISDN — 402 |
|---|---|
| M2ME1 | MSISDN1 |
| M2ME2 | MSISDN2 |
| M2ME3 | MSISDN3 |
| . | . |
| . | . |
| . | . |
| . | . |

GATEWAY APPARATUS, CONTROL METHOD THEREFOR AND COMPUTER PROGRAM

CROSS-REFERENCE TO RELATED APPLICATION(S)

This application claims priority to International Patent Application No. PCT/JP2010/069771, filed Nov. 1, 2010, which is incorporated by reference in its entirety.

TECHNICAL FIELD

The present invention generally relates to a gateway apparatus, a control method therefore and a computer program for IP mobility support for machine-to-machine equipments.

BACKGROUND

Providing cellular connectivity for Machine-to-Machine Communication Equipments (M2MEs) is considered to be important because cellular systems such as UMTS are widely deployed and they provide improved coverage compared to the other wireless communication systems. M2MEs have different requirements from those of mobile handsets. In some case, it is possible for an owner of the M2MEs to manage M2MEs without any human intervention. There could be tighter requirements for M2MEs in terms of their hardware cost and size.

MCIM (Machine Communication Identity Module) is an identity module specifically designed for M2ME. MCIM is semantically the same as the existing identity modules such as USIM. However, MCIM is different from USIM in that the former is not necessarily stored and executed in a smartcard/UICC. MCIM can be stored and executed on different kinds of secure environment as far as the environment provides secure storage and secure execution environment. 3GPP is working on technologies and architectures for enabling flexible and efficient deployment of MCIMs to M2MEs. One of the architecture alternatives defined in 3GPP TR 33.812 allows downloading and provisioning MCIM on M2ME over-the-air. In such a remote subscription scenario, the M2ME first establishes initial connectivity to a mobile network operator called the Initial Connectivity Operator. The M2ME contacts a discovery server called the Discovery and Registration Function (DRF) with a special mobile operator called the Registration Operator (RO). Note that the M2ME is initially provisioned with credentials (i.e., IMSI and K) to connect to the Initial Connectivity Operator. The Registration Operator, when requested by the M2ME, provides information about the way to access a provisioning server called Download and Provisioning Function (DPF). The Registration Operator also selects mobile network operator (hereafter called the Selected Home Operator (SHO)) for the M2ME during the MCIM provisioning procedure. The SHO and the M2ME authenticate to each other. If authentication is successfully done, the MCIM to be assigned for the M2ME is provided by the SHO, and it is delivered to the M2ME through the Registration Operator (RO). After successful installation of MCIM, the M2ME attaches to the SHO using the MCIM to get operational PDN (Packet Data Network) connectivity. Note that in some deployment scenarios, a single operator can play the roles of the Initial Connectivity Operator (ICO) and the Registration Operator (RO).

The M2ME may change the home operator for various reasons. For instance, the M2ME may need to change operator when it is moved out of the coverage of the SHO. In case of home operator change, the M2ME needs to get PDN connectivity from the new SHO. More specifically, the PDN gateway (P-GW) of the new SHO will assign a new IP address to the M2ME.

Whenever the M2ME changes its home operator, a different IP address is assigned to the M2ME. Such an IP address change would cause disruption of communication if the M2ME is in the midst of communication with peers during the operation of home operator change. Even if there is no live communication with any peers during the operation of home operator change, it is not possible for the M2ME to be accessed by the peer unless there is a mechanism that informs the peer of M2ME's new IP address.

Dynamic DNS (DDNS) is considered to be a candidate solution for this problem, but there are some issues with DDNS. First, changes to DNS records do not propagate throughout the network immediately due to DNS cache servers. The DNS cache servers, which are commonly employed by ISPs today, store query results for a certain period of time. The peer cannot know the new IP address assigned to the M2ME until all the caches stored in the DNS cache servers expire and refresh after TTL. Second, DDNS cannot provide session continuity and live connections are to be aborted upon home operator change. For the above reasons, DDNS cannot be a complete solution for the problem.

SUMMARY

The present invention is intended to address the above-described problem, and it is a feature thereof to introduce IP mobility support for M2ME. According to the first aspect of the present invention, there is provided a gateway apparatus which is able to mediate a communication between communication devices, comprising, a registration unit for registering a network address permanently assigned to a communication device in association with a temporary address assigned to the communication device and a flag indicating whether the communication device has been provided with Machine Communication Identity Module (MCIM) or not, a receiving unit for receiving an IP packet including data destined to a destination communication device with the network address of the destination communication device from a source communication device, a determination unit for determining whether the destination communication device whose network address is received by the receiving unit is provided with the MCIM or not, based on a registered value of the flag of the destination communication device, and a transmitting unit for transmitting, to a provision server, a bootstrap message for requesting initiation of provisioning of the MCIM to the destination communication device, when it is determined that the destination communication device is not provided with the MCIM. Further, the transmitting unit may transmit the data received by the receiving unit to the destination communication device using the registered temporary address in association with the network address of the destination device, when it is determined that the destination communication device is provided with the MCIM.

According to the second aspect of the present invention, there is provided a method for controlling a gateway apparatus which is able to mediate a communication between communication devices, and comprises a registration unit for registering a network address permanently assigned to a communication device in association with a temporary address assigned to the communication device and a flag indicating whether the communication device has been provided with Machine Communication Identity Module (MCIM) or not. In the method, an IP packet including data destined to a destination communication device is received with the network address of the destination communication device from a source communication device. Whether the destination communication device whose network address is received by the receiving unit, is provided with the MCIM or not is determined, based on a registered value of the flag of the destination communication device. A bootstrap message for requesting initiation of provisioning of a MCIM to the destination communication device is transmitted to a provision server, when it is determined that the destination communication device is not provided with the MCIM. The received data is transmitted to the destination communication device using the registered temporary address in association with the network address of the destination device, when it is determined that the destination communication device is provided with the MCIM.

According to the third aspect of the present invention, there is provided a computer program which causes a computer to execute a control method of a gateway apparatus which is able to mediating a communication between communication devices, and comprises a registration unit for registering a network address permanently assigned to a communication device in association with a temporary address assigned to the communication device and a flag indicating whether the communication device has been provided with Machine Communication Identity Module (MCIM) or not. In the method, an IP packet including data destined to a destination communication device is received with the network address of the destination communication device from a source communication device. Whether the destination communication device whose network address is received by the receiving unit, is provided with the MCIM or not is determined, based on a registered value of the flag of the destination communication device. A bootstrap message for requesting initiation of provisioning of a MCIM to the destination communication device is transmitted to a provision server, when it is determined that the destination communication device is not provided with the MCIM. The received data is transmitted to the destination communication device using the registered temporary address in association with the network address of the destination device, when it is determined that the destination communication device is provided with the MCIM.

Further features of the present invention will become apparent from the following description of exemplary embodiments with reference to the attached drawings, in which like reference characters designate the same or similar parts throughout the figures thereof.

DETAILED DESCRIPTION

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, electronic devices, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain or store the program for use by or in connection with the instruction execution system, apparatus, or device.

Figure 1:
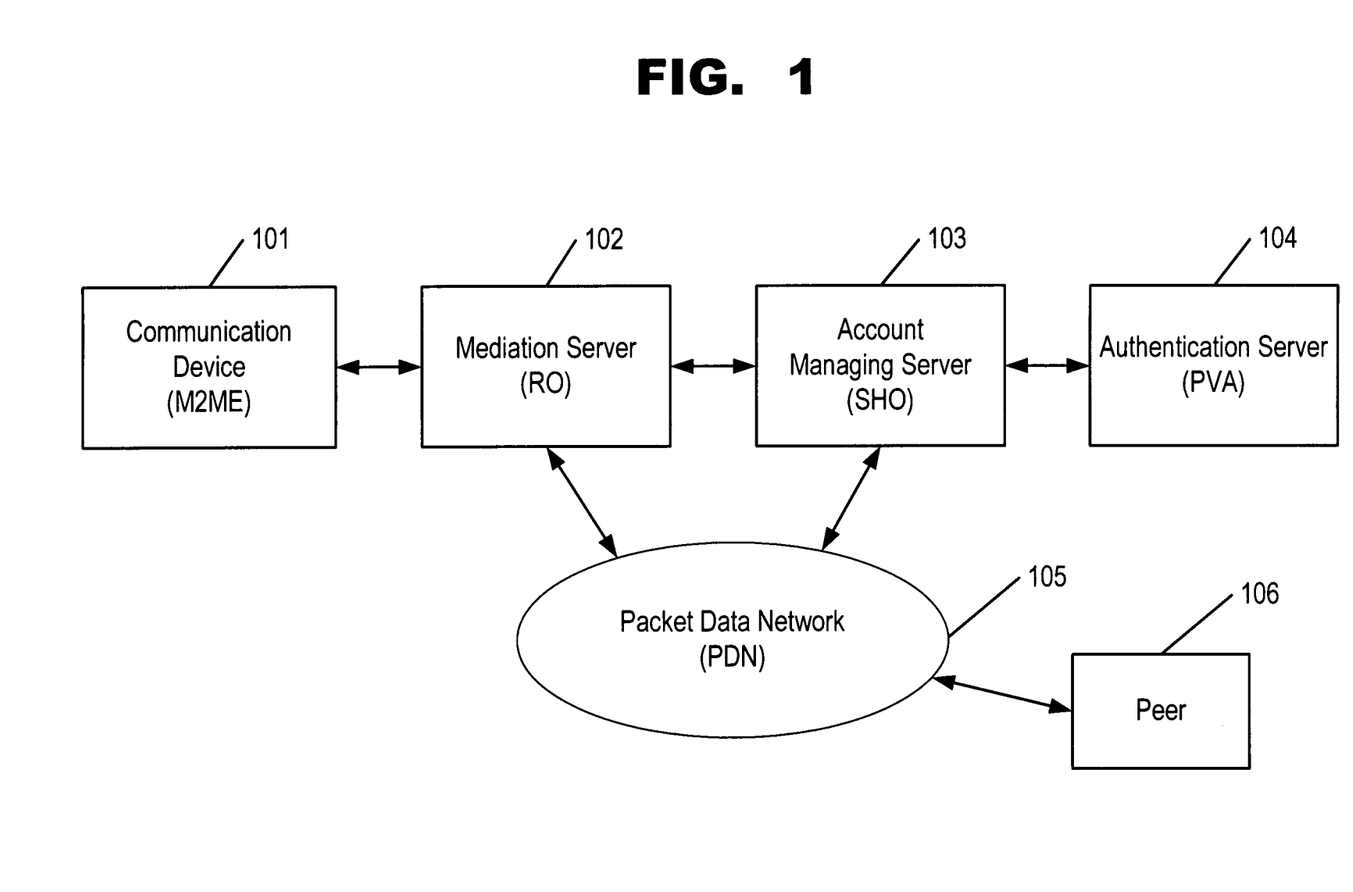
FIG. 1 illustrates an overview of a system 100 according to one aspect of embodiments of the present invention.

FIG. 1 illustrates an overview of a system 100 according to an exemplary embodiment of the present invention. In FIG. 1, a communication device 101 is a device for communicating with a mediation server 102 operated by a registration operator (RO), and contains a Provisional Connectivity Identification (PCID). Examples of the communication device 101 are mobile terminals, digital photo frames, and monitoring sensors. Because the PCID identifies the communication device 101, the PCID can be used as device identification information for identifying the communication device 101. The communication device 101 is intended to obtain a Machine Communication Identity Module (MCIM) of a Selected Home Operator (SHO) as subscription information. Since the communication device 101 corresponds to Machine-to-Machine equipment (M2ME) described in TR 33.812, the term "M2ME" is used in place of the term "communication device" below. However, communication made by the communication device 101 is not limited to machine-to-machine communication. For purposes of illustration, embodiments of the present invention are described herein in the context of the M2ME. It will be understood, however, that the present invention is not limited to such embodiments and may be embodied generally as any communication device that includes binding registration by sending Binding Update message(s) to a home agent (P-GW) according to the embodiment of the present invention.

The mediation server 102 is a server for providing the M2ME 101 with the MCIM of the SHO as an account managing server 103. The purpose of the mediation server in this embodiment 102 is to provide initial connectivity to the M2ME 101 and to provide registration and provisioning functions for the M2ME 101. This typically involves the Initial Connectivity, Discovery and Registration, and MCIM Download and Provisioning Functions. Although the mediation server 102 is illustrated as a single node, the functions of the mediation server 102 may be separated in two or more nodes. The mediation server 102 is operated by the Registration Operator (RO), which is identified by the PCID and serves the M2ME 101 to enable the M2ME 101 to access to a 3GPP network in order to obtain the MCIM.

An account managing server 103 is a server for managing the account information such as the MCIM. Although the account managing server 103 is illustrated as a single node, the functions of the account managing server 103 may be separated in two or more nodes. The account managing server 103 is operated by the SHO.

An authentication server 104 is a server for validating the credentials used to verify the M2ME 101 as a trusted platform. The authentication server may also issue these credentials. Although the authentication server 104 is illustrated as a single node, the functions of the authentication server 104 may be separated in two or more nodes. The authentication server 104 is operated by the Platform Validation Authority (PVA). The authentication server 104 supports the following:

Validation of platform credentials that assert the authenticity and integrity of the M2ME 101 as a platform to hold the MCIM application and credentials;

Providing the DPF and SHO with information related to the success or failure of the validation of the M2ME 101.

Obtaining new platform credentials when required, e.g. after a remote update of the M2ME 101.

A packet data network (PDN) 105 is a packet based network including operator's IP services such as IMS and PSS which is located outside of the core network including the mediation server 102 and the authentication server 103.

A peer 106 is a communication apparatus which communicates with the M2ME 101 through the PDN 105. When the peer 106 works as a source communication device, the M2ME 101 can works as a destination communication device. The peer 106 could be any device as far as it has connectivity to the PDN 105. As used herein, the term "peer" may include any of the following: a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliances that include a radiotelephone transceiver. Peers may also be referred to as "pervasive computing" devices.

Figure 2A:
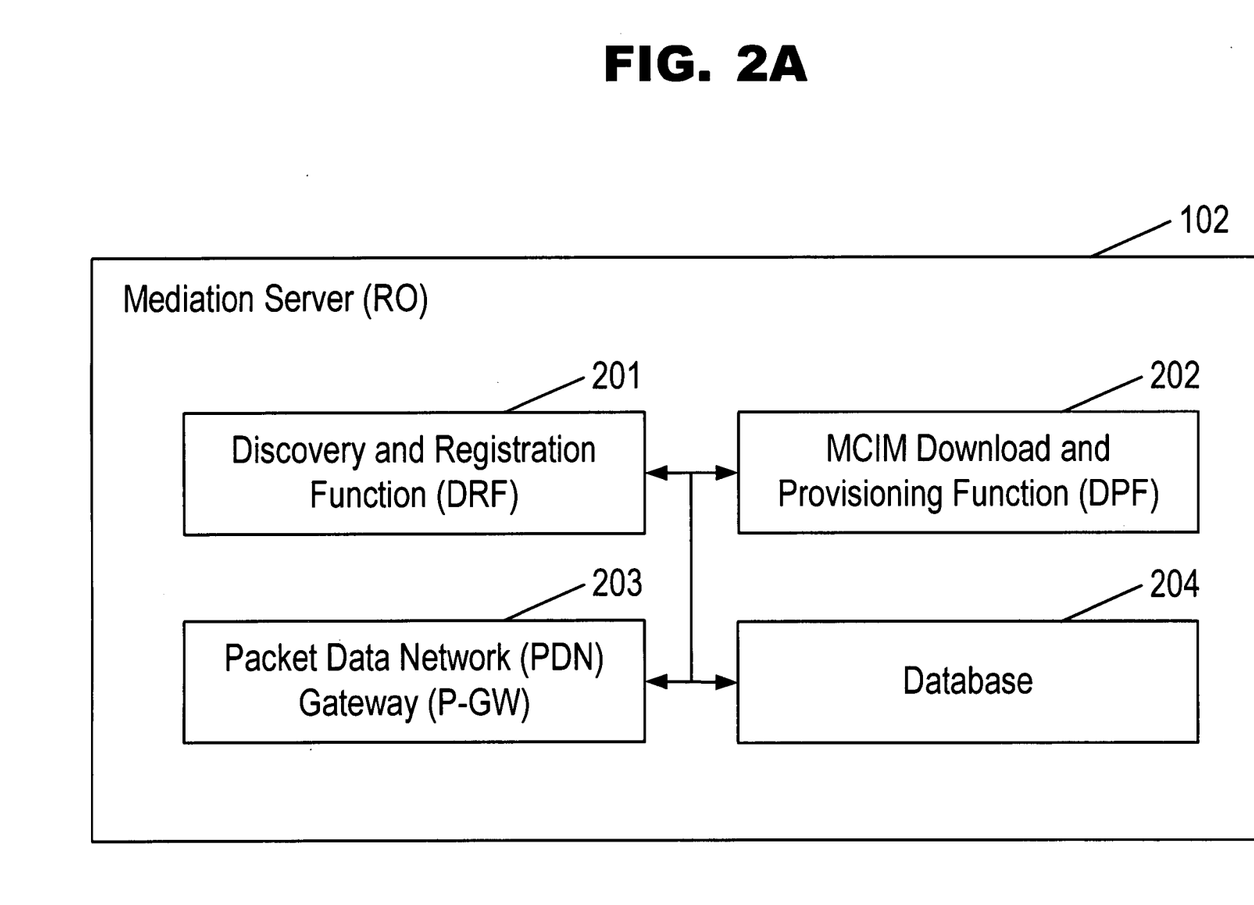
FIG. 2A is a functional block diagram of a mediation server 102 according to one aspect of embodiments of the present invention.

FIG. 2A shows a functional block diagram of the mediation server 102. The mediation server 102 comprises a Discovery and Registration Function (DRF) 201, a MCIM Download and Provisioning Function (DPF) 202, a Packet Data Network Gateway (P-GW) 203, and a database 204. The detailed operations of each functional block in the mediation server 102 will be described later with reference to the sequence diagram of FIGS. 5 and 6.

The DRF 201 helps the M2ME 101 to discover and register with the account managing server 103. Address resolution is included within DRF 201. The DPF 202 is a function for managing the downloading and provisioning of the MCIM applications and credentials to the M2ME 101. In order to perform the secure provisioning of the MCIM applications and their parameters to the M2ME 101, the DPF needs to support functions specified in 3GPP TR 33.812 V9.2.0.

The P-GW 203 is a gateway which terminates the interface towards the PDN 105. Functions of the P-GW 203 includes, for example, per-user based packet filtering (by e.g. deep packet inspection), IP address allocation to the M2ME 101, UL and DL bearer binding as defined in TS 23.203 and UL bearer binding verification as defined in TS 23.203. According to the embodiment of the present invention, P-GW 203 manages binding between Home address and Care of address for the M2ME 101 to provide IP mobility support for the M2ME 101.

Figure 3:
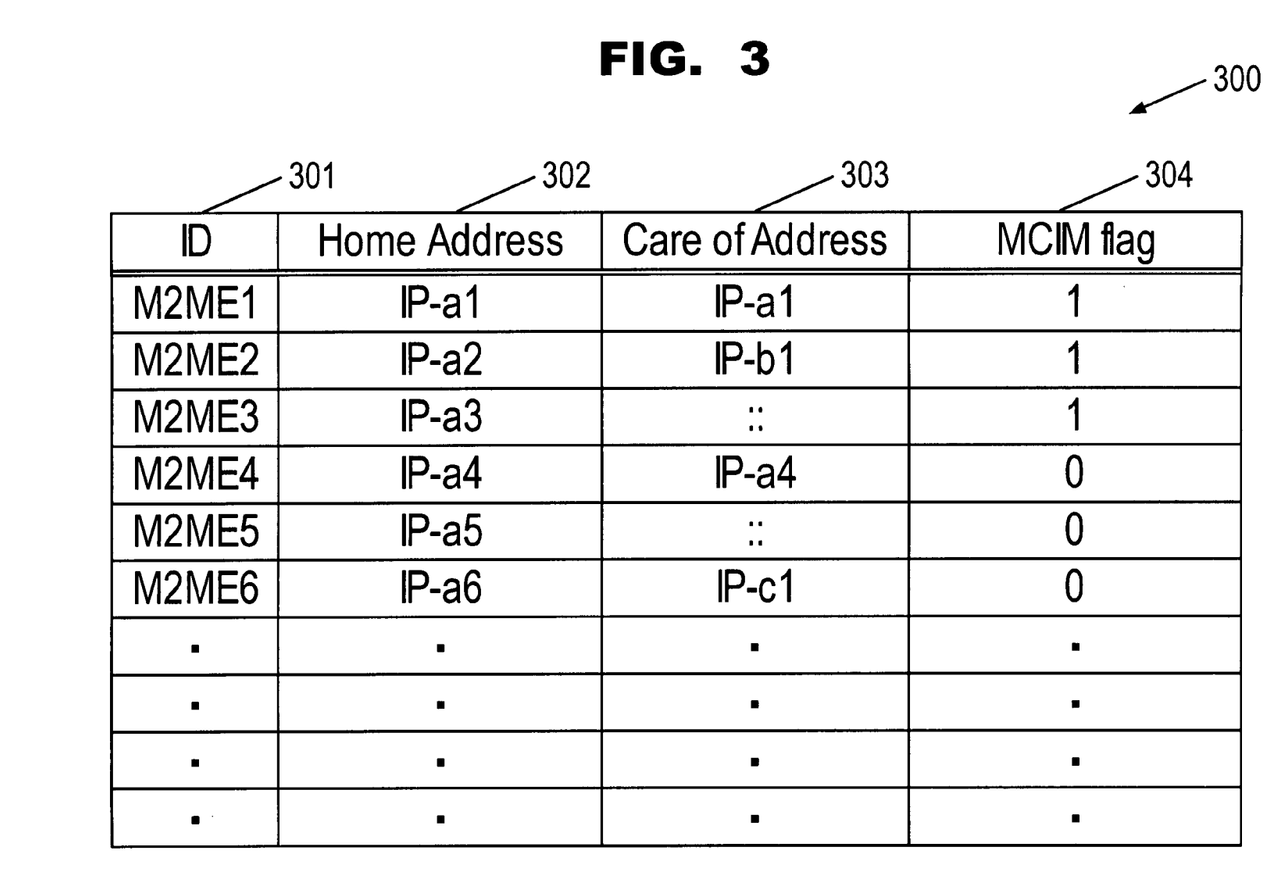
FIG. 3 is an example of an address table 300 according to one aspect of embodiments of the present invention.
Figure 4:
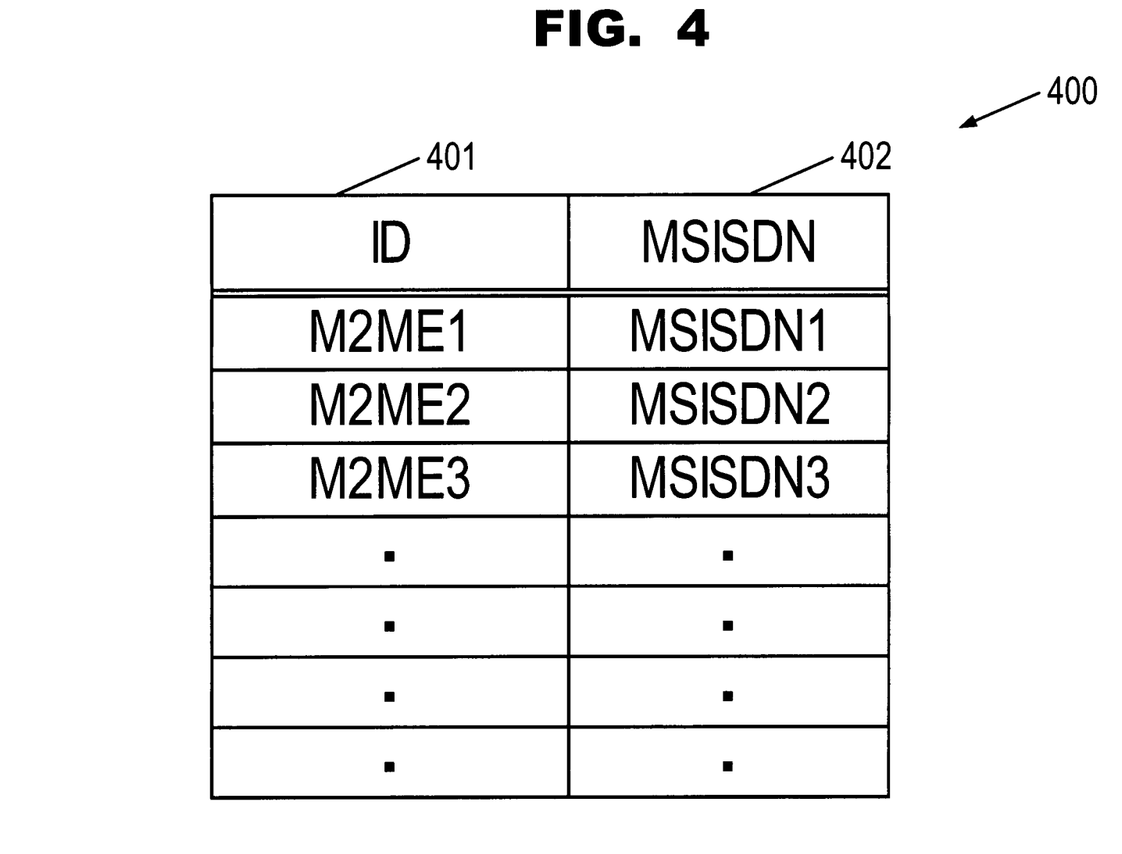
FIG. 4 is an example of an ID table 400 according to one aspect of embodiments of the present invention.

The database 204 stores correspondence between identifier, address and/or access number of respective M2MEs. The database 204 may be a part of the mediation server 102 or may be located on an external network and connected to the mediation server 102. Examples of data tables stored in the database 204 are illustrated in FIGS. 3 and 4.

Figure 2B:
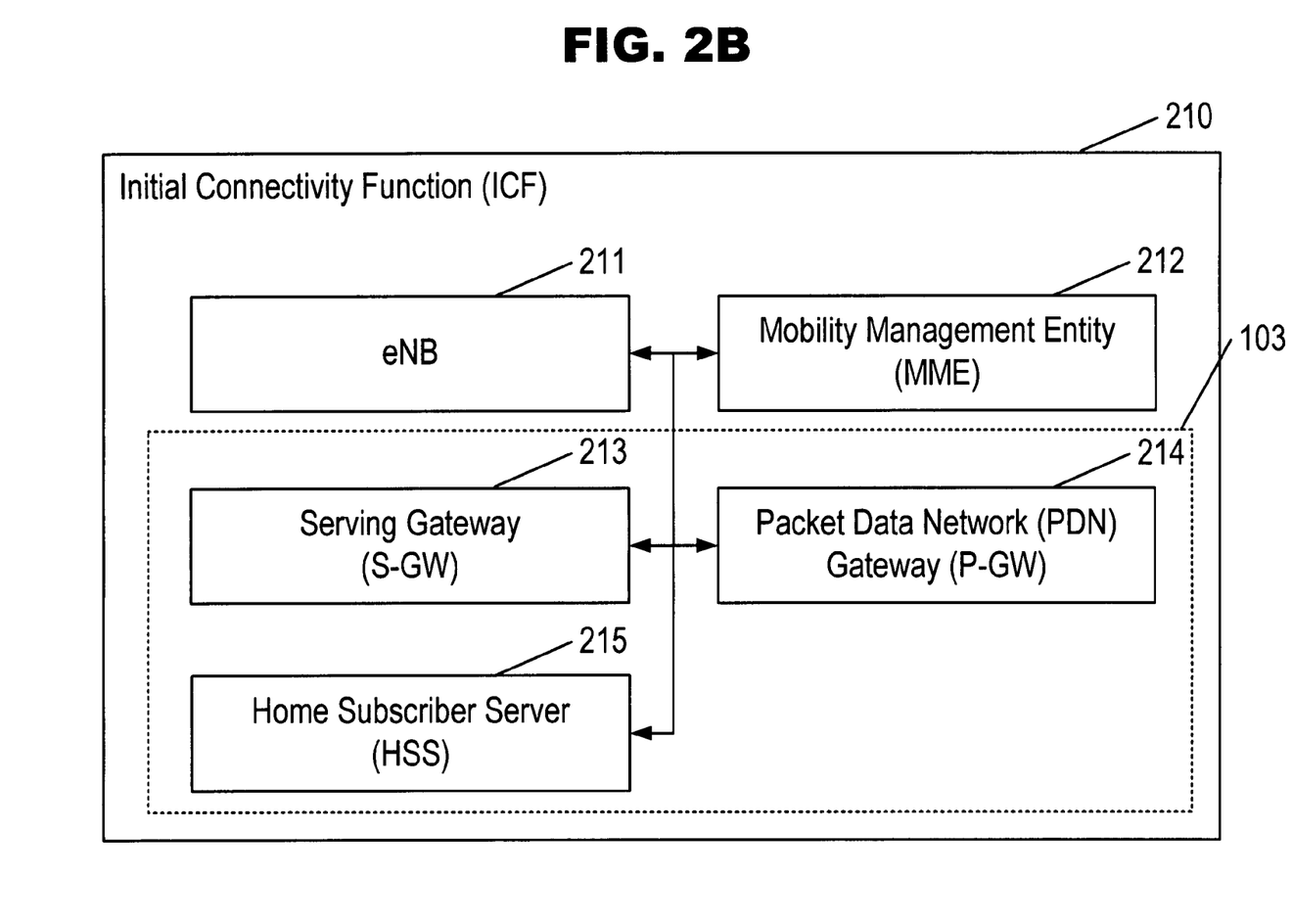
FIG. 2B is a functional block diagram of an Initial Connectivity Function 210 according to one aspect of embodiments of the present invention.

FIG. 2B shows a functional block diagram of an Initial Connectivity Function (ICF) 210 according to embodiments of the present invention applied to the 3GPP SAE network. The ICF 210 is operated by Initial Connectivity Operator (ICO). Note that a single operator may play the roles of ICO and RO for a given M2ME and this is an assumption made in the following embodiment. The ICF 210 provides connectivity services (at layers above the basic network access provided by the eNB) to help with the post-purchase discovery of the SHO. The ICF 210 provides IP connectivity for the M2ME 101 to contact the RO 102 and get necessary information for downloading and provisioning of MCIM credentials and applications. The ICF 210 may include an eNB 211, a Mobility Management Entity (MME) 212, Serving Gateway (S-GW) 213, a Packet Data Network (PDN) Gateway (P-GW) 214 and a Home Subscriber Server (HSS) 215.

The eNB 211 provides temporary 3GPP network access to the M2ME 101, where authentication using credentials such as a PCID may be required. The eNB is operated by the ICO.

The MME 212 is a node having functions of, for example, NAS signaling, NAS signaling security, P-GW and S-GW selection, SGSN selection for handovers to 2G or 3G 3GPP access networks, authentication, authorization, and bearer management functions including dedicated bearer establishment. Further details of MME 212 are defined in 3GPP TS 23.401. The S-GW 213 and the MME 212 may be implemented in one physical node or several separated physical nodes.

S-GW 213 is a gateway which terminates the interface towards E-UTRAN. For each M2ME 101 associated with the EPS, at a given point in time, there is a single S-GW. The functions of the S-GW 213 include for example, the local Mobility Anchor point for inter-eNB 211 handover, sending of one or more "end marker" to the source eNB 211, source SGSN or source RNC immediately after switching the path during inter-eNB 211 and inter-RAT handover, especially to assist the reordering function in eNB 211. Further functions of S-GW 213 are defined in 3GPP TS 23.401.

The P-GW 214 is a gateway which terminates the interface towards the PDN 105. In this embodiment, functions of the P-GW 214 are the same as the P-GW 203 in FIG. 2A.

The HSS 215 acts as a central repository of all subscriber-specific authorizations and service profiles and preferences. The HSS 215 integrates several functions, some of which exist already in the functions of the Home Location Register of mobile networks: Subscriber Profile Database, Subscriber Service Permissions, Subscriber Preference Settings, Mobile Authentication Server, Home Location Register (HLR) for mobile roaming, Subscriber Presence Function and Subscriber Location Function.

Figure 2C:
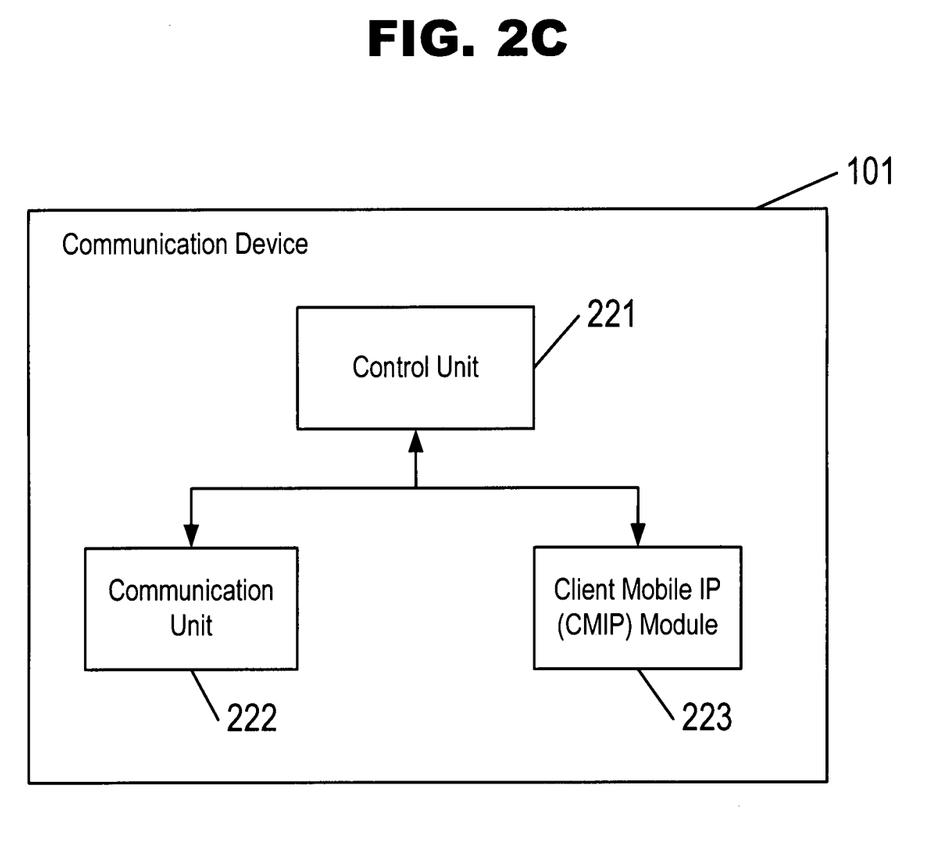
FIG. 2C is a functional block diagram of a communication device 101 according to one aspect of embodiments of the present invention.

As shown in FIG. 2C, the M2ME as the M2ME 101 comprises a control unit 221, a communication unit 222 and a Client Mobile IP (CMIP) module 223. The control unit 221 controls overall operation of the M2ME 101. The communication unit 222 includes a transmitter and a receiver for communicating with other nodes. The CMIP module 223 performs binding registration by sending Binding Update message(s) to the home agent (P-GWs 203) according to the embodiment of the present invention. Detailed binding registration will be described with reference to FIGS. 5 and 6 below. It should be noted that the functionality of each block in the M2ME 101 may be implemented using dedicated hardware, using software executed by a processor (not shown), or a combination thereof.

Figure 2D:
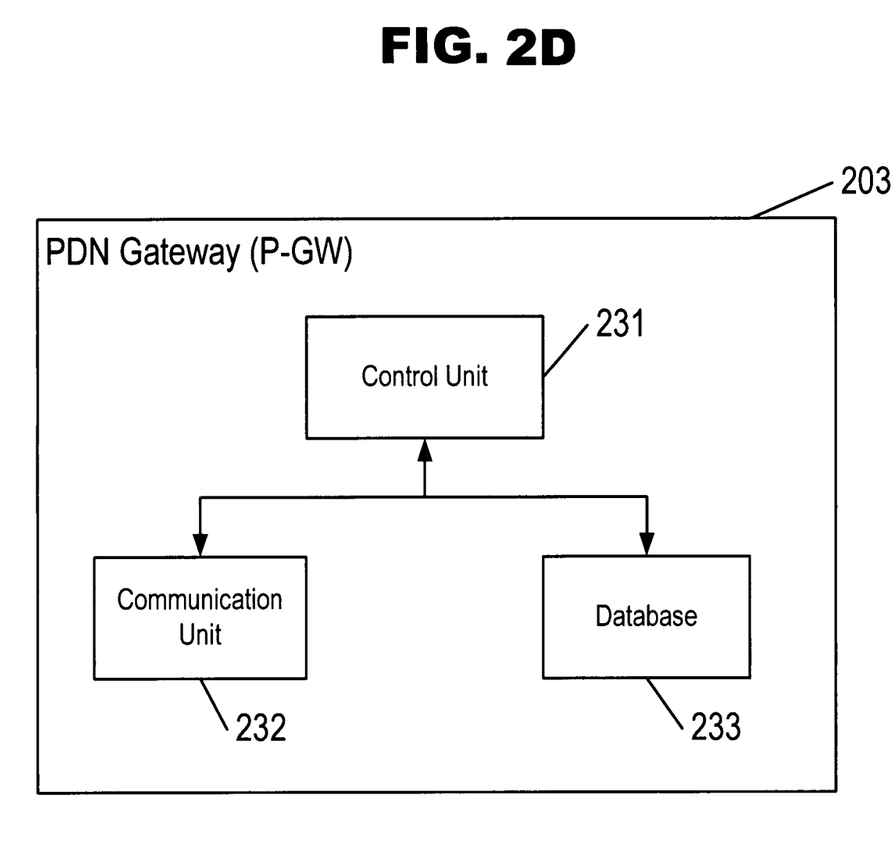
FIG. 2D is a functional block diagram of a P-GWs 203 and 214 according to one aspect of embodiments of the present invention.

As shown in FIG. 2D, the P-GWs 203 comprise a control unit 231, a communication unit 232 and a database 233. The control unit 231 controls overall operation of the P-GWs 203 including identification of the destined M2ME 101 based on the IP address set as the destination address of the received IP packet from the peer 106 which sends the IP packet to the M2ME, and controls determining whether the destined M2ME has already been provided with MCIM or not based on the entries in an address table 300 shown in FIG. 3, as well as updating the address table 300 by received Mobile IP address from the M2ME which gets a temporary address from the visited network and notifies it by Binding Update to the P-GW 203. The control unit 231 also retrieves the PCID of the destined M2ME from the address table 300 and generates a Trigger MCIM message with the retrieved PCID of the M2ME to be transmitted to the DRF 201 for initiating the MCIM provisioning to the destined M2ME.

The communication unit 232 includes a transmitter and a receiver for communicating with other nodes. For example, the communication unit 232 receives IP packet transmitted from the peer 106 from the PDN 105 and transmits the IP packet to the M2ME 101 if the M2ME is provided with MCIM and the M2ME has PDN connectivity. The communication unit 222 also transmits the Trigger MCIM request message to DRF 201 for initiating MCIM provisioning.

The database 233 may store the address table 300 for storing binding of the Home address and the Care of Address as shown in FIG. 3. It should be noted that the functionality of each block in the P-GWs 203 may be implemented using dedicated hardware, using software executed by a processor (not shown), or a combination thereof.

In the described embodiment according to the present invention, a single operator plays the role of RO and ICO for a given M2ME. In this case, the permanent address (home address) of the M2ME and the temporary address (Care of address) of the M2ME become the same on the initial binding registration.

FIG. 3 shows an exemplary embodiment of the address table 300 according to the present invention. Entries in the address table 300 shown in FIG. 3 include identification information (ID) 301 of each M2ME 101, Home address 302, Care of Address 303 and MCIM flag 304. The ID 301 may include any kind of information which permits to uniquely identify the M2ME 101, for example, it may be Provisional Connectivity ID (PCID) which is an International Mobile Subscriber Identity (IMSI) of a kind or an International Mobile Equipment Identifier (IMEI) which is uniquely assigned to each M2ME 101. In this embodiment, such a case where the PCID is used as the ID of M2ME will be described below as an example but not limited thereto.

The Home address 302 indicates an IP address permanently assigned to the M2ME 101 by the Registration Operator. Address assignment can be made either at the time of manufacture or on request basis. The Registration Operator may assign an IP address for a M2ME 101 at the time of manufacturing and register the assigned IP address as the Home address 302 in the address table 300. When the mediation server 102 assigns the IP address as the Home address for the M2ME 101 on request basis, in response to an attempt by the M2ME 101 to connect the mediation server 102 functioning as an Initial Connectivity Function, the mediation server 102 assigns an IP address for the M2ME from its IP address pool. Note that the IP address is a Mobile home address in the context of IP mobility management.

The Care of Address (CoA) 303 indicates such an IP address that is actually used by the M2ME 101 to connect any one of home operators. The Care of Address in the address table can therefore be used to determine whether if the M2ME has PDN connectivity or not. Whenever the M2ME 101 changes its home operator, a different IP address is assigned to the M2ME 101 and the assigned IP address is registered in the address table 300 as the Care of Address 303.

In the address table 300, three types of entries are stored as the Care of Address 303. The first one is the same IP address as the one stored in the Home address 302 for the same M2ME. In this case, M2ME 101 is connecting to the home operator with the Home address meaning that the M2ME is connected to the RO being an ICO. The second one is the mobile IP address assigned to the M2ME by such a home operator where the M2ME is visiting. The third one is a predetermined address, such as an IPv6 unspecified address (::), indicating that the M2ME does not have any PDN connectivity from any operator and thus it has no Care of address. In the example shown in FIG. 3, M2ME1, M2ME2, M2ME4 and M2ME6 have PDN connectivity and M2ME3 and M2ME5 does not have PDN connectivity. When the M2ME 101 is detached from the network in a MS-initiated manner, it sends a Binding Update message to the P-GW 203 with lifetime zero. Then the P-GW 203 updates the value of the Care of Address 303 with a predetermined value "::". On the other hand, when the M2ME 101 is detached from the network in a network-initiated manner, the P-GW 203 does not receive any Binding Update message from the M2ME 101. Instead, the detachment of the M2ME shall be discovered by a kind of heartbeating mechanism which is used to monitor connectivity of a given M2ME2.

The MCIM flag 304 indicates whether MCIM provisioning has been done for the M2ME 101 or not. Value "0" indicates that the M2ME 101 has not been provisioned with any MCIMs yet, whereas the value "1" indicates that the M2ME has been provisioned with the MCIM.

Whenever the M2ME 101 needs to change its home operator, it takes the procedure defined in Section 5.1.3.7.4 of 3GPP TR 33.812. Note that 3GPP TR 33.812 specifies two ways of changing home operator: 1) re-provisioning using connectivity provided by an old SHO, and 2) reverting to the pristine state. In the former case, the M2ME gets a new IP address assigned by the new SHO, which will result in changing its Care of address from one to another in the context of Mobile IP. In the latter case, the M2ME 101 reverts to the pristine state, which means that the M2ME is disconnected from the old SHO, gets connected to the Initial Connectivity Operator (ICO), then performs MCIM provisioning and gets connected to the new SHO. In any case, the Client Mobile IP module 223 inside the M2ME 101 performs binding registration by sending Binding Update message(s) to the home agent (P-GWs 203 and 214). Detailed binding registration will be described with reference to FIGS. 5 and 6 below.

FIG. 4 shows an exemplary embodiment of an ID table 400 according to the present invention. Entries in the ID table 400 shown in FIG. 4 include identification information (ID) 401 of each M2ME 101 and a Mobile Subscriber ISDN number (MSISDN) 402. The ID 401 corresponds to the ID 301 in the address table 300 and PCIDs of M2ME 101 are stored as the ID 401. The MSISDN 402 is a telephone number that gets assigned to a subscriber (M2ME 101). The ID table 400 is used by the DRF 201 for identifying the M2ME 101 to be provisioned with the MCIM. Therefore, the ID table 400 may be stored locally in the DRF 201 or stored in the database 204 in the RO and the DRF 201 can access to the database via a certain network.

Figure 5:
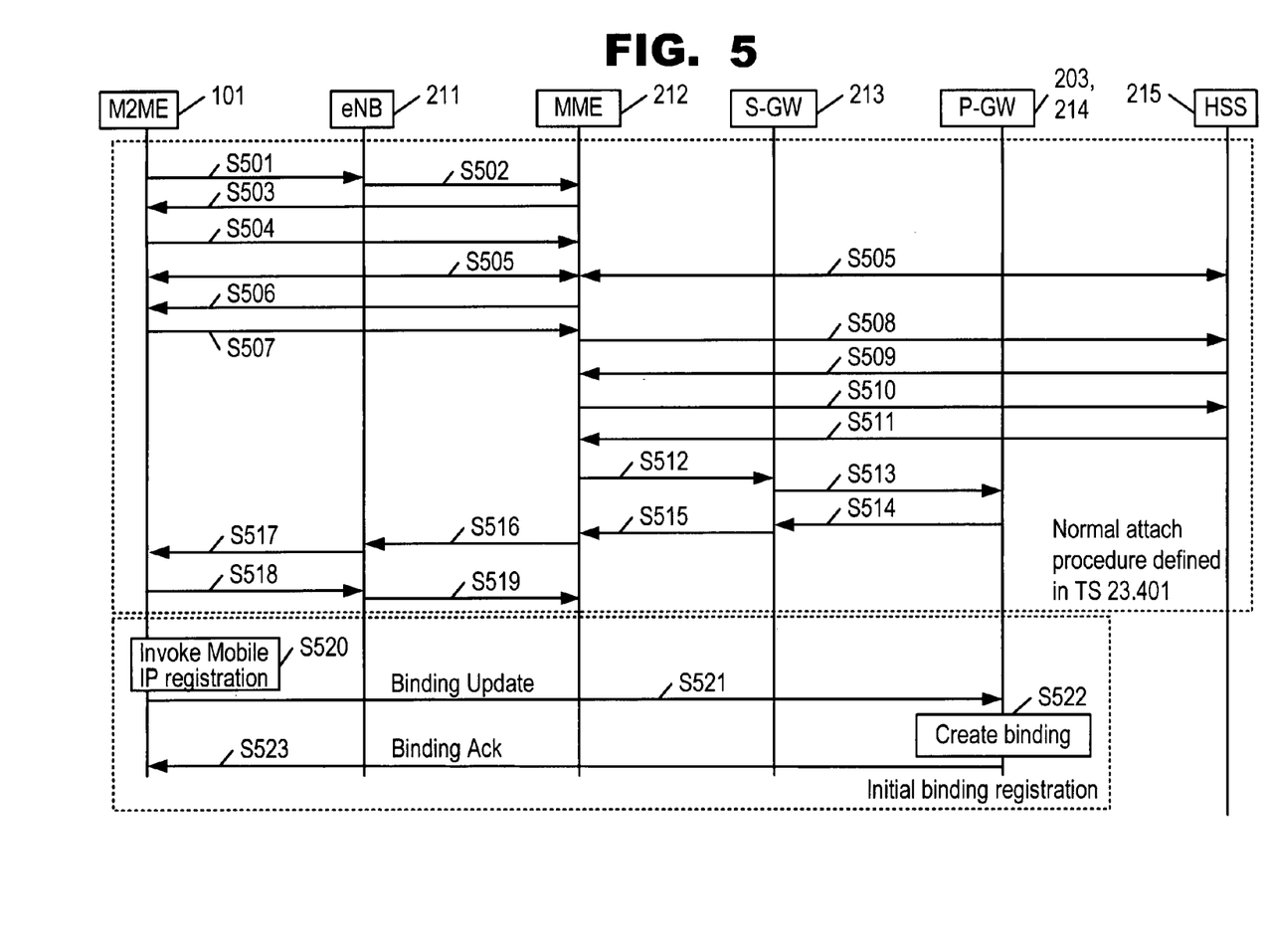
FIG. 5 is a sequence diagram illustrating an exemplary embodiment of a procedure for initial connectivity setup by the M2ME 101 according to one aspect of embodiments of the present invention.

FIG. 5 shows an exemplary embodiment of a procedure for initial connectivity setup by the M2ME 101 according to the present invention. In this embodiment, the setup operation is followed by Mobile IP binding registration. Steps S501 to S519 correspond to the standard procedures for IP bearer establishment defined in 3GPP TS 23.401. The M2ME gets a Care of Address 303 assigned by the P-GW 214 of ICO (RO). Since the RO plays the role of ICO in this example, the temporary address of the M2ME is set as the network address of the M2ME permanently assigned by the RO.

The M2ME 101 needs to register with the network to receive services that require registration. This registration is described as Network Attachment. The always-on IP connectivity for the M2ME 101 of the EPS (Evolved Packet System) is enabled by establishing a default EPS bearer during Network Attachment. The PCC rules applied to the default EPS bearer may be predefined in the P-GW 214 and activated in the attachment by the P-GW 214 itself. The Attach procedure may trigger one or multiple Dedicated Bearer Establishment procedures to establish dedicated EPS bearer(s) for that the M2ME 101. During the attach procedure, the M2ME 101 may request for an IP address allocation. Terminals utilizing only IETF based mechanisms for IP address allocation are also supported. The allocated IP address is informed by the Binding Update to the P-GW 203 operated by the RO for storing the address table 300 in the P-GW 203.

In S501, the M2ME 101 initiates the Attach procedure by the transmission, to the eNB 211, of an Attach Request (IMSI or old GUTI, last visited TAI (if available), UE Core Network Capability, UE Specific DRX parameters, Attach Type, ESM message container (Request Type, PDN Type, Protocol Configuration Options, Ciphered Options Transfer Flag), KSI-$_{ASME}$, NAS sequence number, NAS-MAC, additional GUTI, P-TMSI signature) message together with RRC parameters indicating the Selected Network and the old GUMMEI.

In S502, the eNB 211 derives the MME 212 from the RRC parameters carrying the old GUMMEI and the indicated Selected Network. In S503, the MME 212 sends an Identity Request to the M2ME 101 to request the IMSI. In S504, The M2ME 101 responds with Identity Response (IMSI).

In S505, if no M2ME context for the M2ME exists anywhere in the network, if the Attach Request (sent in S501) was not integrity-protected, or if the check of the integrity failed, then authentication and NAS security setup to activate integrity protection and NAS ciphering are mandatory. Otherwise it is optional. If NAS security algorithm is to be changed, the NAS security setup is performed in this step.

In S506 and S507, if the M2ME 101 has set the Ciphered Options Transfer Flag in the Attach Request message, the Ciphered Options (i.e. PCO, APN or both), are to be retrieved from the M2ME 101. In order to handle situations where the M2ME 101 may have subscriptions to multiple PDNs, if the Protocol Configuration Options contain user credentials (e.g. user name/password within PAP or CHAP parameters) then the M2ME 101 should also send the APN to the MME 212.

In S508, the MME 212 sends an Update Location Request (MME Identity, IMSI, and so on.) message to the HSS 215. In S509, the HSS 215 sends an Insert Subscriber Data (IMSI, Subscription Data) message to the MME 212. In S510, the MME 212 updates the stored Subscription Data and acknowledges the Insert Subscriber Data message by returning an Insert Subscriber Data Ack (IMSI) message to the HSS 215. The update result should be contained in the Ack message. In S511, the HSS 215 acknowledges the Update Location message by sending an Update Location Ack (IMSI, Subscription data) message to the MME 212.

In S512, the MME 212 selects the S-GW 213 and allocates a Bearer Id for default bearer associated with the M2ME 101. The MME 212 sends a Create Default Bearer Request message to the S-GW 213 with IMSI, MSISDN, MME TEID for control plane, RAT type, P-GW address, PDN Address, Default EPS Bearer QoS, PDN Type, subscribed APN-AMBR, APN, EPS Bearer Id, Protocol Configuration Options, and so on. The PDN address indicates the IP address to be assigned to the M2ME 101. MSISDN is included if the attach type indicates handover.

In S513, The S-GW 213 creates a new entry in its EPS Bearer table and sends the Create Session Request message to the P-GW 214 indicated by the P-GW address received in S512. After this step, the S-GW 213 buffers any downlink packets it may receive from the P-GW 214 without sending a Downlink Data Notification message to the MME 212 until it receives the Modify Bearer Request message later.

In S514, the P-GW 214 creates a new entry in its EPS bearer context table and generates a charging ID. The new entry allows the P-GW 214 to route user plane PDU's between the S-GW 213 and the packet data network 105 and to start charging. The P-GW 214 returns a create default bearer response with P-GW address for the user plane, P-GW TEID of the user plane, P-GW TEID of the control plane, PDN Type, PDN address, EPS Bearer Identity, EPS bearer QoS, and so on.

In S515, the S-GW 213 returns a create default bearer response to MME with PDN Type, PDN Address, S-GW address for User Plane, S-GW TEID for User Plane, S-GW TEID for control plane, EPS bearer Identity, EPS bearer QoS, P-GW addresses and TEID's at the P-GW for uplink traffic, Protocol configuration options, Charging ID, and so on.

In S516, the MME 212 sends an Attach Accept message to the eNB 211 with APN, GUTI, PDN Type, PDN Address, TAI List, EPS Bearer Identity, Session Management Request, Protocol Configuration Options, NAS sequence number, NAS-MAC, IMS Voice over PS session supported Indication, Emergency Service Support indicator, LCS Support Indication.

In S517, the eNB 211 sends the RRC Connection Reconfiguration message including the EPS Radio Bearer Identity to the M2ME 101, and the Attach Accept message will be sent along to the M2ME 101. The M2ME 101 shall store the QoS Negotiated, Radio Priority, Packet Flow Id and TI, which it received in the Session Management Request, for use when accessing via GERAN or UTRAN. The APN is provided to the M2ME 101 to notify it of the APN with which the activated default bearer is associated. For further details, see 3GPP TS 36.331.

In S518, the M2ME sends the RRC Connection Reconfiguration Complete message to the eNB 211 For further details, see 3GPP TS 36.331. In S519, the eNB 211 sends the Attach Complete message to the MME 212 in an Uplink NAS Transport message.

After the Attach Accept message and once the M2ME 101 has obtained a PDN Address, the M2ME 101 can then send uplink packets towards the eNB 211 which will then be tunneled to the S-GW 213 and P-GW 214.

Therefore, in S520, the Client Mobile IP (CMIP) module 223 inside the M2ME monitors the status of the IP address availability and takes necessary actions. In this case, the CMIP module 223 detects that the M2ME gets an IP address assigned in the previous step by the Initial Connectivity Operator which is operating the eNB 211, MME 212 S-GW 213, P-GW 214 and HSS 215 and thus it initiates Mobile IP binding registration towards the P-GW 203 as a home agent according to the present invention.

In S521, the Client Mobile IP module 223 inside the M2ME 101 sends a Binding Update message with the communication unit 222 to the P-GW 203 which is operated by the RO (in this embodiment, the RO is act as the ICO). Even if the RO does not play the role of ICO, since the M2ME 101 has already known the address of the P-GW 203 as the home agent and uses it for the Binding Update message. In S522, the P-GW 203 receives the Binding Update message from the M2ME 101 and creates a binding cache entry by updating the address table 300 for the mobile node. In case of initial attachment of the M2ME 101, the Care of Address 303 stored in the address table 300 is the same as the Home address 302 as shown in FIG. 3 in relation to M2ME1. However, if the ICO is a different operator from the RO, the Care of Address 303 will be a different address from the Home address 302, as illustrated in FIG. 3 in relation to M2ME2 and M2ME 6. In S523, the P-GW 203 sends a Binding Ack message to the M2ME 101. In the above, the Client Mobile IP module 223 of the M2ME and the P-GW 203 may use IPsec to authenticate Binding Update and Binding Ack messages. Alternatively, they may use CGA-based authentication taking advantage of the PKI-based credentials (i.e., certificates, private keys).

After the initial attachment, whenever the M2ME 101 needs to change its home operator, it takes the procedure defined in Section 5.1.3.7.4 of 3GPP TR 33.812. Note that 3GPP TR 33.812 specifies two ways of changing home operator: 1) re-provisioning using connectivity provided by old SHO, and 2) reverting to the pristine state. In the former case, the M2ME 101 gets a new IP address assigned by the new SHO 103, which will result in changing its Care of Address 303 in the context of Mobile IP. In the latter case, the M2ME 101 reverts to the pristine state, which means that the M2ME 101 is disconnected from the old SHO 103, gets connected to the Initial Connectivity Operator (ICO), then performs MCIM provisioning and gets connected to the new SHO 103. In any case, the Client Mobile IP module 223 inside the M2ME 101 performs binding registration by sending Binding Update message(s) to the home agent (P-GW).

Figure 6:
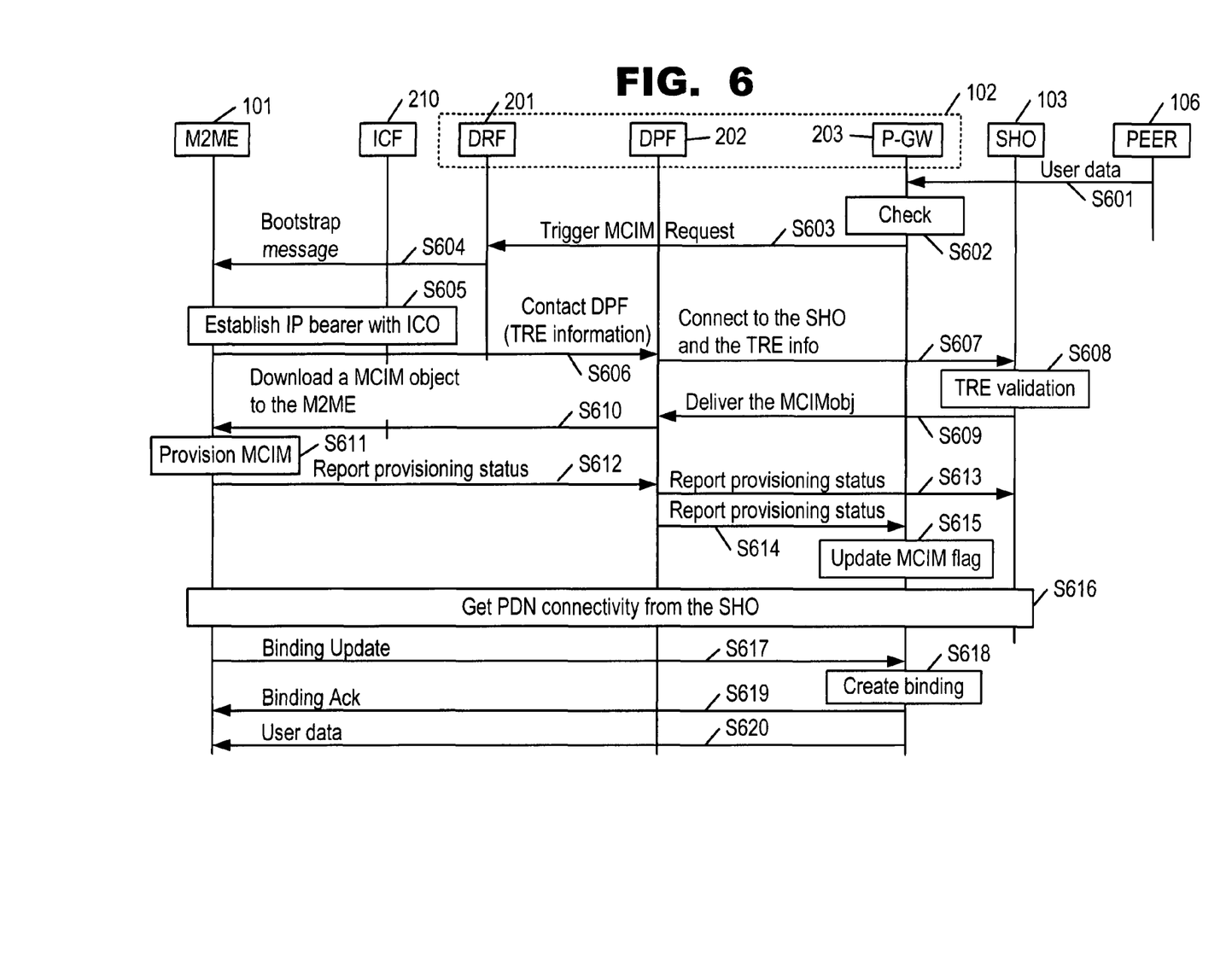
FIG. 6 is a sequence diagram illustrating an exemplary embodiment of a procedure for triggering a MCIM provisioning when receiving an IP packet addressed to the M2ME 101.

The embodiment of the present invention allows the IP gateway to trigger MCIM provisioning by signaling the Discovery and Register Function (DRF) inside the Registration Operator (102). FIG. 6 shows the P-GW (Mobile IP home agent) 203 can trigger a MCIM provisioning when receiving an IP packet addressed to an M2ME 101.

In S601, the P-GW 203 which is operated by the Registration Operator receives an IP packet which carries user data addressed to the M2ME's permanent IP address (i.e. the Home address 302.) from a peer 601. In this embodiment, the peer may be any type of M2ME which can access to the PDN 105.

In S602, the P-GW 203 checks the MCIM flag 304 in the address table 300 keyed by the Home address extracted from the IP packet. If the MCIM flag 304 indicates that the M2ME 101 has not been provisioned with MCIM (MCIM flag=0), the P-GW 203 further determines whether to trigger an MCIM provisioning in S603. The P-GW 203 manages rules in the database 233 to be used to authorize MCIM provisioning. Table 1 shows an example of a rule table in the database 233 according to the embodiment of the present invention. The rule table registers two rules identified by an identifier (ID) and each rule has a traffic selector. The traffic selector includes a set of parameters of a source IP (src_ip), a destination IP (dst_ip), source port (src_port), a destination port (dst_port) and a protocol, which corresponds to 5 tuple in the IP network field to be used to identify traffic.

The P-GW 203 refers to the rule table when it needs to authorize MCIM provisioning on receiving an IP packet destined to the M2ME 101 which has not been provided with MCIM. The P-GW 203 extracts information relating to the 5 tuple from a header portion of the received IP packet and compares it with the rules registered in the rule table. If the extracted information matches with one of the two rules registered in the rule table, the MCIM provisioning will be authorized for the destination device of M2ME 101 in S603. If the extracted information does not match with any of registered rules, the MCIM provisioning will not be authorized and the received IP packet data will be discarded by the P-GW 203.

TABLE 1

| ID | Traffic selector <src_ip, dst_ip, src_port, dst_port, protocol> |
|---|---|
| 1 | 10.0.0.1, 192.168.1.1, *, 8080, HTTP |
| 2 | 10.0.0.2, 192.168.1.2, *, 8080, HTTP |

In this example as shown in Table 1, rule identified by rule ID 1 means that MCIM provisioning is authorized when the P-GW receives an IP packet from 10.0.0.1 destined to 192.168.1.1:8080 which contains a HTTP message.

Also in S602, if the MCIM flag 304 indicates that the M2ME 101 has already been provisioned with MCIM (MCIM flag=1), the P-GW 203 further checks the Care of address 303 of the corresponding entry. When the Care of address 303 is set as the predetermined address indicating that the M2ME is not assigned any IP addresses, such as the IPv6 unspecified address (::), the P-GW 203 silently discards the IP packet and sends an error report to the sender of the packet. Otherwise, the P-GW 203 forwards the IP packet to the Care of address 303 of the M2ME as per Mobile IP in S620.

According to examples illustrated in FIG. 3, the MCIM flags 304 of M2ME1, M2ME2 and M2ME3 are the value of "1", the P-GW 203 checks the Care of Address 303. For M2ME 1 and 2, they have effective IP addresses which are used to transfer the received IP packet to each M2ME. On the other hand, M2ME3 has the predetermined address of "::" and the P-GW 203 discards the IP packet destined to the M2ME3. For the M2ME4, M2ME5 and M2ME6, the value of each MCIM flag 304 is "0", the MICM provisioning will be executed for them in S603.

In S603, the P-GW 203 sends a signaling message (Trigger MCMI request message) for triggering MCIM provisioning to the DRF 201. The signaling message contains the TRE_id of the M2ME 101. According to the embodiment of the present invention, PCID can be used as a TRE_id assigned to the M2ME 101 and HTTP can be used as a transport of the signaling message. TRE_id of the M2ME 101 may be retrieved from the address table 300 which stores respective IDs 301 of the M2MEs 101 in association with the Home address 302 uniquely assigned to the M2ME 101.

In step S604, the DRF 201 sends the Bootstrap message to the M2ME 101 using short message service (SMS) addressed to the MSISDN assigned to the M2ME 101. The DRF resolves the MSISDN by looking up the ID table 400 keyed by the received TRE_id (i.e., PCID in this embodiment). In the message the DRF 201 includes the IP connectivity parameters (NAPDEF), the address of the DPF 202 (Server URL), the context of the MCIM application provision and the context of the M2M application provision.

In step S605, IP bearer establishing process between M2ME 101 and ICF 210 is executed. This step corresponds to S501 to S519 in FIG. 5. After IP bearer establishment, in S606, the M2ME 101 contacts the DPF 202 and includes relevant information of the M2ME 101 and the TRE (e.g. platform validation info). In S607, the DPF 202 connects to the account managing server 103, and relays the information of the M2ME 101 and TRE there.

In S608, the account managing server 103 executes TRE validation process. In this step, the account managing server 103 sends the validation info signed by the PfC and TRE identity to the authentication server 104 associated with the account managing server 103 and requests the authentication server 104 to validate the authenticity and integrity of the TRE. Note that the authentication server 104 operated by the Platform Validation Authority (PVA) is omitted in FIG. 6 for simplicity. The authentication server 104 may be integrated into or separated from the account managing server 103. The authentication server 104 locally validates the authenticity and integrity of the M2ME 101, according to the requirements of the account managing server 103. The authentication server 104 sends the validation results back to the account managing server 103, according to requirements from the account managing server 103. The account managing server 103 encrypts the MCIM by using the PfC and generates the management object for the M2ME 101 (e.g MCIMobj).

In S609, the account managing server 103 delivers the encrypted MCIM (e.g. within MCIMobj) to the DPF 202 and authorizes provisioning of the MCIM application to the M2ME 101. In step S610, the DPF 202 downloads a MCIM object to the M2ME 101 and in S611, the M2ME 101 provisions the downloaded MCIM into the TRE. The TRE decrypts MCIMobj by using the TRE Platform Key to obtain the MCIM.

In S612, the M2ME 101 reports the success/failure status of the provisioning to the DPF 202. In S613, the DPF 202 transfers the success/failure status of the provisioning from the M2ME to the account managing server 103. Note that the MCIM provisioning procedure according to S606 to S613 corresponds to 3GPP TR 33.812.

In S614, the DPF 202 sends the success/failure status of the provisioning, with the PCID of the corresponding M2ME 101, to the P-GW 203. In S615, The P-GW 203 updates the value of the MICM flag 304 in the address table 300 according to the status report received from the DPF 202.

In S616, after successful downloading and provisioning of MCIM, the M2ME 101 gets PDN connectivity from the SHO 103 using the MCIM. In S617, the Client Mobile IP module 223 inside the M2ME 101 sends the Binding Update message to the home agent (P-GW 203). In S618 the home agent (P-GW 203) creates a binding cache entry by updating the address table 300 for the M2ME 101 and sends a Binding Ack message to the client (M2ME 101) in S619. In S620, the P-GW 203 as the home agent forwards the IP packets including received user data in S601, which have been buffered, to the M2ME 101 using the Mobile IP tunnel.

According to the described embodiment of the present invention, such a procedure for triggering MCIM provisioning by receiving IP packets addressed to the M2ME's permanent IP address will be provided. Therefore, third parties are allowed to trigger MCIM provisioning by means of sending IP packets to the target M2MEs. In order to prevent DoS attack, the P-GW 203 allows the M2ME subscriber to configure filter for preventing unauthorized third parties from triggering MCIM provisioning.

Furthermore, such a procedure for identifying a need for IP mobility support for the M2ME during the initial step of MCIM provisioning will be provided. The method for registering the PDN address, which is newly assigned to the M2ME 101 when the M2ME changes home operator, with the Mobile IP home to update the Care of address in the binding cache entry will also be provided.

In addition, according to the described embodiment of the present invention, the M2ME 101 can always be accessed by the same IP address, regardless of the home operator. Even when the M2ME 101 changes its home operator, the IP address assigned to the M2ME remains the same thanks to the IP mobility support provided by the Registration Operator. This capability is considered to be valuable for applications that require stable and seamless IP connectivity to the M2ME (e.g., surveillance camera). The IP address to be assigned to the M2ME 101 may be provisioned at the time of manufacture. This allows the M2ME manufacturer to expose the service entry point (e.g., a URI consisting of an IP address, a port number, and a context root of the web service to be provided by the M2ME) to potential service providers/consumers for the M2ME. The MCIM provisioning can be triggered when there is actual need for the M2ME 101 to obtain IP connectivity. More specifically, the Registration Operator can trigger MCM provisioning for a M2ME 101 when there is an attempt to access the M2ME.

While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions.

The invention claimed is:

1. A gateway apparatus, comprising:
a transmitter;
a receiver for receiving from a source communication device an IP packet including data destined for a destination communication device and a home network address assigned to the destination communication device; and
a processor, wherein the processor is configured to register the home network address in association with a temporary address assigned to the destination communication device and a flag indicating whether or not the destination communication device has been provided with Machine Communication Identity Module (MCIM);

the processor is further configured to determine, in response to the gateway apparatus receiving the IP packet, whether MCIM provisioning for the destination communication device should be triggered, wherein the processor is configured to determine whether to trigger the MCIM provisioning by, at the least, determining the value of said flag associated with the home network address; and the processor is further configured to employ the transmitter to transmit to a provision server a message for requesting initiation of the MCIM provisioning for the destination communication device as a result of determining that MCIM provisioning for the destination communication device should be triggered.

2. The gateway apparatus according to claim 1, wherein
said receiver is operable to receive, from the destination communication device, a notification of a temporary address that is obtained by the destination communication device during MICIM provisioning, and said processor is configured such that, in response to the receiving unit receiving said notification, the processor registers the temporary address in association with the home network address of the destination communication device and updates the flag corresponding to the registered temporary address.

3. The gateway apparatus according to claim 1, wherein
said processor is configured to determine whether to trigger the MCIM provisioning by determining the value of the flag associated with the home network address and determining whether information included in a header portion of the IP packet matches a rule.

4. The gateway apparatus according to claim 3, wherein said processor determines to authorize the MCIM provisioning, when the information included in a header portion of the IP packet matches the rule.

5. The gateway apparatus according to claim 1, wherein
said is further configured to determine whether the destination communication device has PDN connectivity, and said processor is configured to discard the data destined to the destination communication device when it is determined that the destination communication device does not have PDN connectivity.

6. The gateway apparatus according to claim 5, wherein said processor is configured to determine whether the destination communication device has PDN connectivity based on a value of the temporary address registered in a registration unit.

7. The gateway apparatus according to claim 6, wherein said processor is configured to determine that the destination communication device has PDN connectivity, when the value of the temporary address in said registration unit is different from a predetermined address value.

8. The gateway apparatus according to claim 1, wherein the home network address is uniquely assigned to the destination communication device.

9. The gateway apparatus according to claim 1, wherein the temporary address is a Care of Address.

10. A method for Machine Communication Identity Module (MCIM) provisioning, comprising:
a gateway apparatus receiving an IP packet having a header portion containing a destination address, wherein the destination address is assigned to a communication device;

the gateway apparatus, in response to receiving the IP packet, determining whether MCIM provisioning for the communication device should be triggered, wherein the determining comprises determining the value of a flag associated with the destination address; and the gateway apparatus transmitting a request for initiating the MCIM provisioning in response to determining that the MCIM provisioning should be triggered.

11. The method of claim 10, wherein
the method further comprises storing a rule, wherein the rule comprises a first network address, and
determining whether MCIM provisioning for the communication device should be triggered further comprises determining whether a source network address included in the header portion of the IP packet matches the first network address included in the rule.

12. The method of claim 11 wherein
the rule further comprises a second network address, and a first port number, and
determining whether MCIM provisioning for the communication device should be triggered further comprises determining whether a destination port number included in the header portion of the IP packet matches the first port number included in the rule.

13. A computer program product comprising a non-transitory computer readable medium storing computer instructions for Machine Communication Identity Module (MCIM) provisioning, the computer instructions comprising:
first determining instructions for determining whether MCIM provisioning should be triggered for a device in response to receipt of an IP packet comprising an IP header having a destination address field storing an IP address assigned to the device, the first determining instructions including instructions for determining the value of an MCIM provisioning flag associated with the IP address; and instructions for transmitting a request for initiating the MCIM provisioning for the device in response to the determining instructions determining that the MCIM provisioning should be triggered.

* * * * *

UNITED STATES PATENT AND TRADEMARK OFFICE
CERTIFICATE OF CORRECTION

| | | |
|---|---|---|
| PATENT NO. | : 9,204,416 B2 | Page 1 of 1 |
| APPLICATION NO. | : 13/881025 | |
| DATED | : December 1, 2015 | |
| INVENTOR(S) | : Sugimoto et al. | |

It is certified that error appears in the above-identified patent and that said Letters Patent is hereby corrected as shown below:

In the specification

In Column 5, Line 54, delete "authentication server 103." and insert -- authentication server 104. --, therefor.

In Column 6, Line 50, delete "Serving" and insert -- a Serving --, therefor.

In the claims

In Column 15, Line 43, in Claim 5, delete "said" and insert -- said processor --, therefor.

Signed and Sealed this
Eighth Day of March, 2016

Michelle K. Lee
*Director of the United States Patent and Trademark Office*